(12) United States Patent
Hiraiwa

(10) Patent No.: US 6,724,763 B1
(45) Date of Patent: Apr. 20, 2004

(54) NETWORK SYSTEM

(75) Inventor: Hisaki Hiraiwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/259,685

(22) Filed: Mar. 1, 1999

(30) Foreign Application Priority Data

Mar. 6, 1998 (JP) ......................................... P10-055614

(51) Int. Cl.[7] ............................................. H04L 12/28
(52) U.S. Cl. ...................................................... 370/401
(58) Field of Search ................................ 370/401, 402, 370/403, 400, 408, 419, 420, 421, 463; 709/249; 710/126, 128, 129

(56) References Cited

U.S. PATENT DOCUMENTS

| | | | | |
|---|---|---|---|---|
| RE33,426 E | * | 11/1990 | Sugimoto et al. ........... | 370/402 |
| 5,018,137 A | * | 5/1991 | Backes et al. ............... | 470/401 |
| 5,088,090 A | * | 2/1992 | Yacoby ....................... | 370/402 |
| 5,214,646 A | * | 5/1993 | Yacoby ....................... | 370/402 |
| 5,504,747 A | * | 4/1996 | Sweazey ..................... | 370/403 |
| 5,515,513 A | * | 5/1996 | Metzger et al. ............. | 709/249 |
| 6,266,728 B1 | * | 7/2001 | Sugita et al. ................ | 710/126 |

* cited by examiner

*Primary Examiner*—Chi Pham
*Assistant Examiner*—Alexander O. Boakye
(74) *Attorney, Agent, or Firm*—Jay H. Maioli

(57) ABSTRACT

A packet passed to an IEEE 1394 bus is received by a packet receiver (421) and stored into a packet buffer (422). Source and destination IDs from the packet buffer (422) are supplied to a comparison/calculation circuit (428) which are also supplied with ID values from a subnetwork routing register (425), bus routing register (426) and node IDs register (427). The comparison/calculation circuit (428) will judge, based on such signals, whether the packet is to be transferred, and when it decides that the packet is to be transferred, will activate the output signal and open a gate (423) to transmit the packet to an inner fabric (401).

10 Claims, 17 Drawing Sheets

(physical_ID IS HELD)

NETWORK SYSTEM

BACKGROUND OF THE INVENTION

1. Field of the Invention

The present invention relates to a network system including a plurality of buses formed from a plurality of nodes connected to each other with transmission control signal channels each capable of transmitting a mixture of a control signal and on information signal.

2. Description of Related Art

Recently, networking many computers and their peripheral devices or AV devices connected to each other has become more and more popular. Each of the devices connected in the network system is called a "node" and incorporates an interface for connection thereof to the network system.

The construction of a conventional network system is illustrated by way of example in FIG. 1. The network system is generally indicated with a references numeral 300. As seen, it comprises a plurality of buses 301 each formed from a plurality of nodes 303 connected to each other with a transmission control channel. The buses 301 are connected to each other with bridges 302.

A signal channel designed in conformity to the serial interface standard IEEE 1394 may be used as the transmission control signal channel. Under the standard IEEE 1394, one bus 301 may have a maximum of 63 nodes connected thereto. When more than 63 nodes are to be connected in one bus 301, more than one bus 301 has to be provided and such buses must be connected to each other with bridges 302. The standard IEEE 1394 prescribes that a large-scale network may be organized using a maximum of 1,023 buses. Also under the IEEE 1394, interconnection of the buses and bus ID assignment should be done automatically. The procedure of the bus ID assignment is called a "configuration". When a bus or buses is added to or deleted from an existing network system, the configuration is started and executed on the entire network system.

FIG. 2 shows a simplified network system model in which 9 buses in total are connected to each other with bridges. Bus ID #0 to #8 are assigned to the buses, respectively. Portals included in different buses are provided at opposite ends of each bridge, and each of the portals has a register intended for discrimination of an ID No. of a destination bus. The bridge connecting a bus of ID #0 and a one of ID #1 is taken here for example. One of the portals has a register in which a lower bound of 1, upper bound of 5 and rte of 2 are set for a destination bus ID (D). Namely, these parameters define a requirement of $1 \leq D \leq 5$. The other portal has a register in which a lower bound of 1, upper bound of 5 and rte of 3 are set for a destination bus ID (D). These parameters define a requirement of D<1 and 5<D. Thus, when the destination bus ID given to a packet which is to be sent from the bus of ID #0 is over 1 and under 5, the bridge will pass the packet to the bus of ID #1. If the destination bus ID imparted to a packet to be sent from the bus of ID #1 is under 1 and over 5, the bridge will pass the packet to the bus of ID #0.

rte is also defined to be 0 and 1 in addition to 2 and 3. Briefly, rte=0 means "disable", rte=1 means "reserve", rte=2 means lower$\leq$D$\leq$upper, and rte=3 means D<lower and upper<D. When rte=0, no packet will be transferred.

When the buses included in a network system have been increased in number, some buses will be deleted from the network system while some new buses are additionally introduced into the network system. The bus deletion and addition are frequently done. At each time, the whole network system has to be subjected to a configuration, which will cause a frequent interrupt of data transmission in the network system. Also, the reconfiguration will possibly lead to failure of a network component or node and missing of data, The computer and its peripheral devices are required to have a specially high reliability. Therefore, if the network system is reconfigured frequently, the computer and devices will possibly operate with no stability. Such frequent reconfiguration is not desirable of course.

In a large-scale network system including many buses, there is a high possibility that buses are connected to each other using a circuit-connected type channel as in public telephone network or a channel as in radio communications in which circuit connection is so unstable that the circuit is abruptly discontinued or reconnected. In such a case, the network system will possibly be reconfigured frequently and thus will be very unstable.

Also the network will not always operate in complete accordance with the standard since a node or bridge will possibly malfunction or be faulty. This will also cause the network system operation to be unstable.

SUMMARY OF THE INVENTION

It is therefore an object of the present invention to provide a network system in which less configuration is required when the bus topology has changed.

According to the present invention, there is provided a network system including a plurality of subnetworks each formed from at least a bus in which at least a node is connected via a common transmission control signal channel, a first bridge holding first flags for the number of buses in the subnetworks and second flags for the number of subnetworks, and a second bridge connecting the subnetworks and holding flags for the number of subnetworks.

According to another aspect of the present invention, the first bridge includes means for comparing a destination ID of a packet data from the node and the first and second flags to judge, based on the two flags, whether the packet data is to be transferred to any other bus, and means for outputting the packet data corresponding to the result of the comparison from the comparing means.

According to another aspect of the present invention, the second bridge includes means for comparing a destination ID of a packet data from the node and the first and second flags to judge, based on the two flags, whether the packet data is to be transferred to any other bus, and means for outputting the packet data corresponding to the result of the comparison from the comparing means.

According to another aspect of the present invention, the first bridge includes two input/output means for connection to one bus and any other bus, respectively. The second bridge includes two input/output means for connection to one subnetwork and any other subnetwork, respectively. Furthermore, the second bridge may include more than three input/output means for connecting more than three subnetworks.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
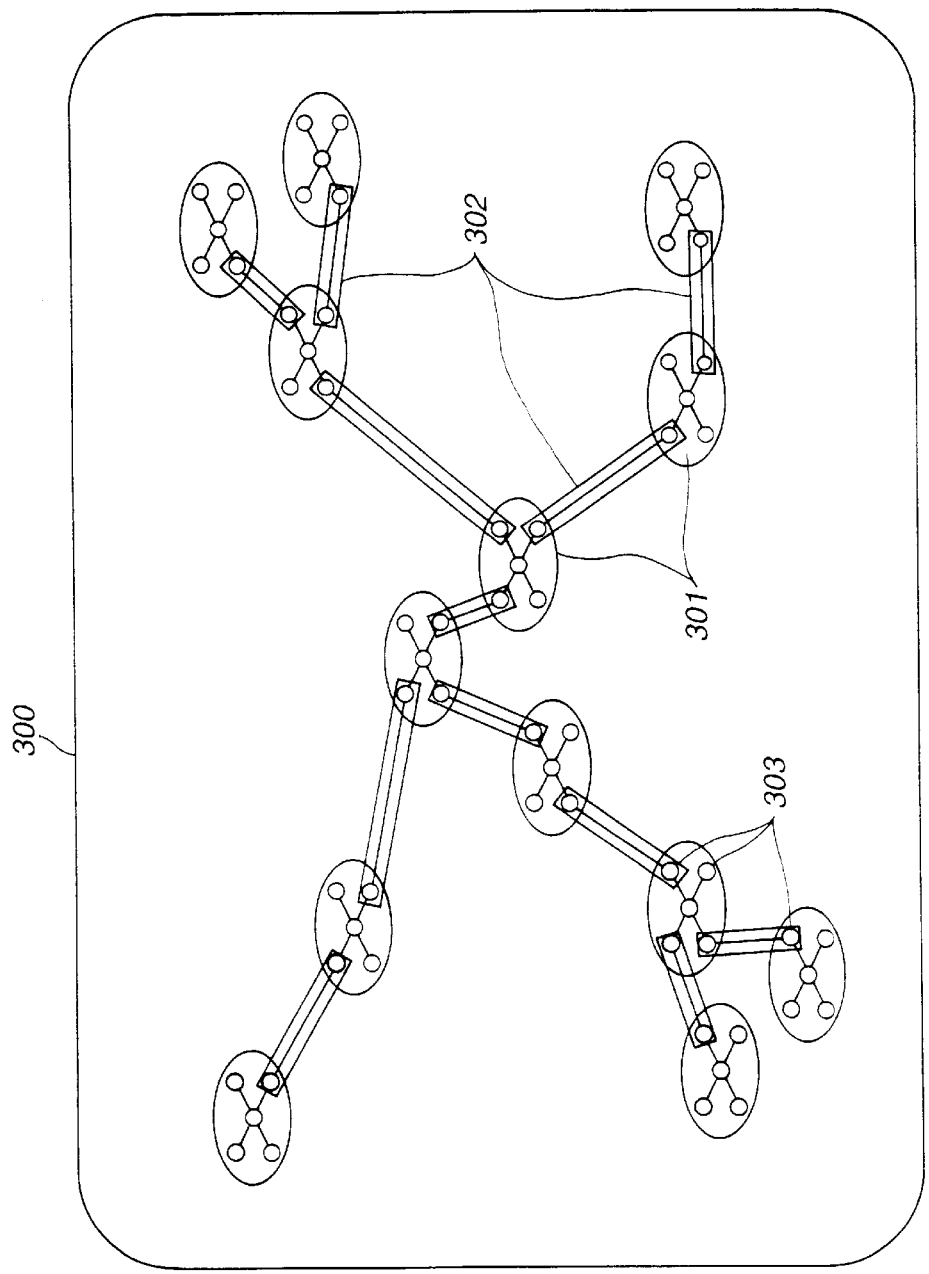
FIG. 1 shows the construction of a conventional network system.
Figure 2:
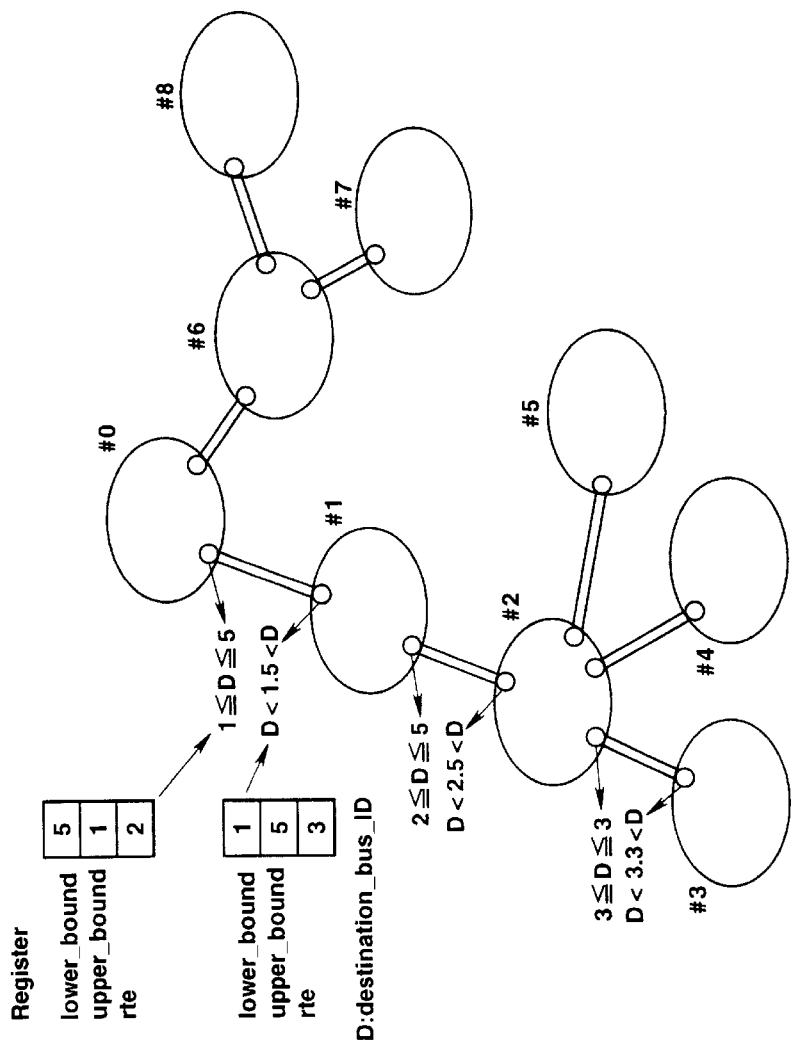
FIG. 2 shows the bus ID assignment in the conventional network system.
Figure 3:
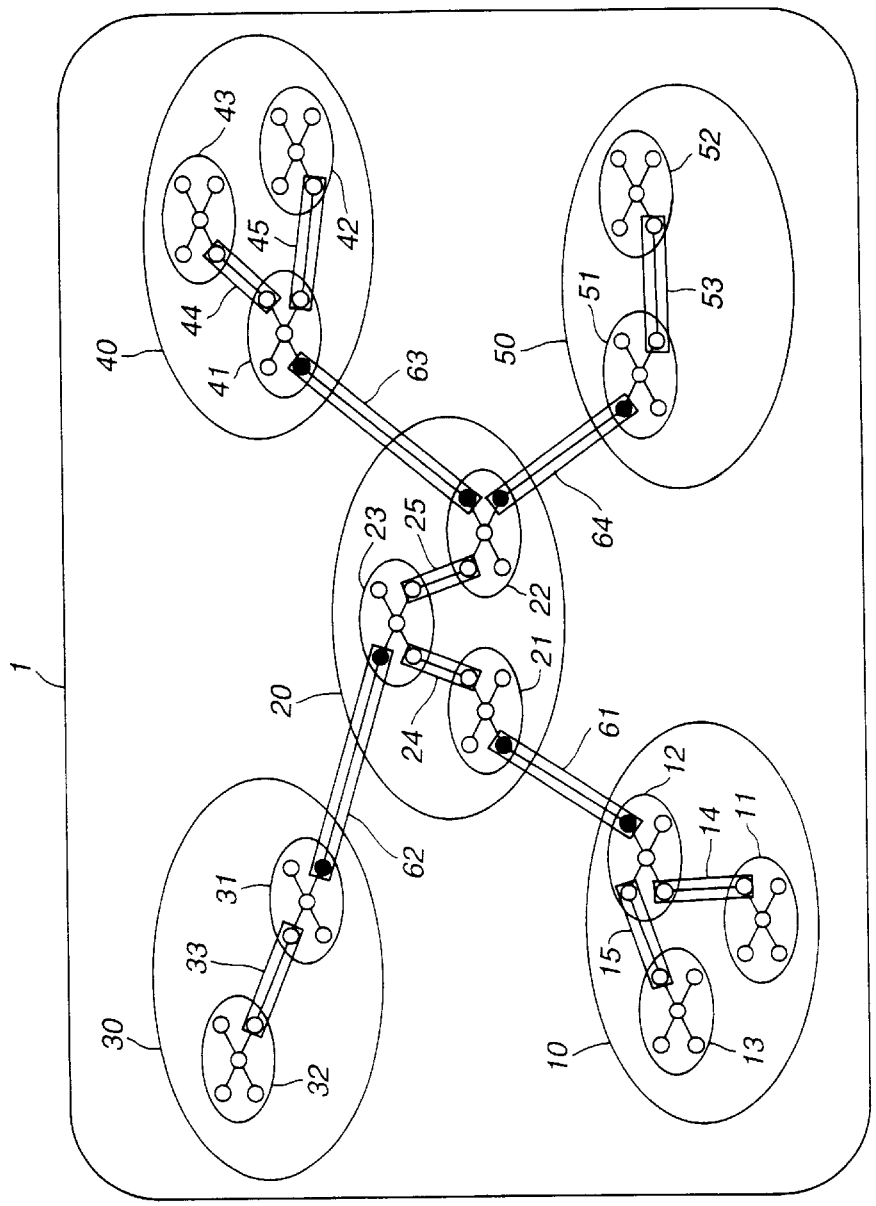
FIG. 3 shows the construction of an embodiment of the network system according to the present invention.

Referring now to FIG. 3, there is schematically illustrated an embodiment of a network system according the present invention. The network system is generally indicated with a reference numeral 1, of which the construction will be described herebelow. The network system is formed from many computers and their peripheral devices or AV devices connected to each other. In the network system 1, each of the devices incorporates an interface for connection thereof Each of the devices will be referred to as "node" hereinafter.

IEEE 1394 prescribes that one bus should include a maximum of 63 nodes. A small-scale network may be composed of a single bus. For connection of more nodes, however, a plurality of buses have to be provided and connected to each other with bridges. IEEE 1394 prescribes that one network system should include a maximum of 1,023 buses.

Nevertheless, the network system 1 according to the present invention comprises the bus for each of five subnetworks 10, 20, 30, 40 and 50 as shown in FIG. 3.

The subnetwork 10 comprises three buses 11, 12 and 13 formed from a plurality of nodes connected to each other with transmission control signal channels designed in conformity with IEEE 1394, for example. The buses 11 and 12 are connected to each other with a first bridge 14, while the buses 12 and 13 are connected to each other with a first bridge 15. The subnetwork 20 includes three buses 21, 22 and 23. The buses 21 and 23 are connected to each other with a first bridge 24, while the buses 22 and 23 are connected to each other with a first bridge 25.

The subnetwork 30 comprises two buses 31 and 32 connected to each other with a first bridge 33. The subnetwork 40 comprises three buses 41, 42 and 43. The buses 41 and 42 are connected to each other with a first bridge 45, while the buses 41 and 43 are connected to each other with a first bridge 44. The subnetwork 50 comprises two buses 51 and 52 connected to each other with a first bridge 53.

Of these subnetworks, the subnetworks 10 and 20 are connected to each other with a second bridge 61, the subnetworks 20 and 30 are connected to each other with a second bridge 62, the subnetworks 20 and 40 are connected to each other with a second bridge 63, and the subnetworks 20 and 50 are connected to each other with a second bridge 64.

Each of the subnetworks has a channel ID peculiar to the network system. Each of the buses in each subnetwork has a bus ID peculiar to the subnetwork. Also, each of the nodes in each bus has a physical ID peculiar to the bus. Thus, each node can be definitely identified with the channel, bus and physical IDs in the network system. Each node incorporates an inner register which holds such channel, bus and physical IDs for the node.

Figure 4:
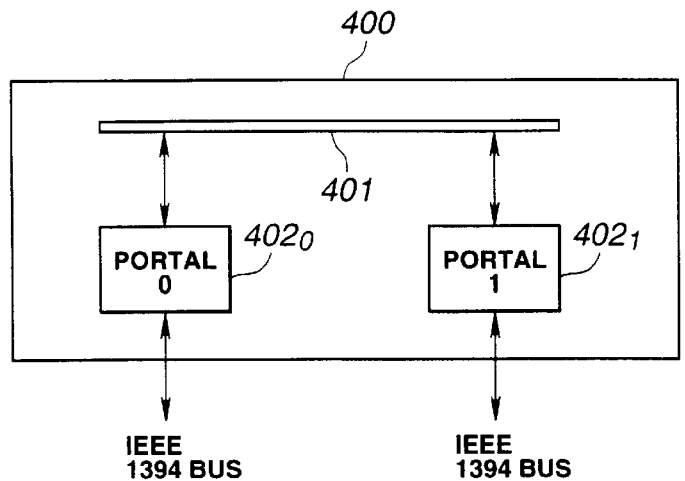
FIG. 4 is a schematic block diagram of a first bridge to provide a connection between buses in the network system.

Referring now to FIGS, 4 and 5, there are illustrated the first and second bridges whose constructions will be described herebelow. The first bridge is generally indicated with a reference 400. As shown in FIG. 4, the first bridge 400 comprises portals $402_0$ and $402_1$ connected to each other with a fabric 401 being a fiber channel switch. The portals $402_0$ and $402_1$ are connected to each node with an IEEE 1394 bus, respectively. It should be noted that the portal is also a node. The first bridge will be further described later concerning its construction and function.

Figure 5:
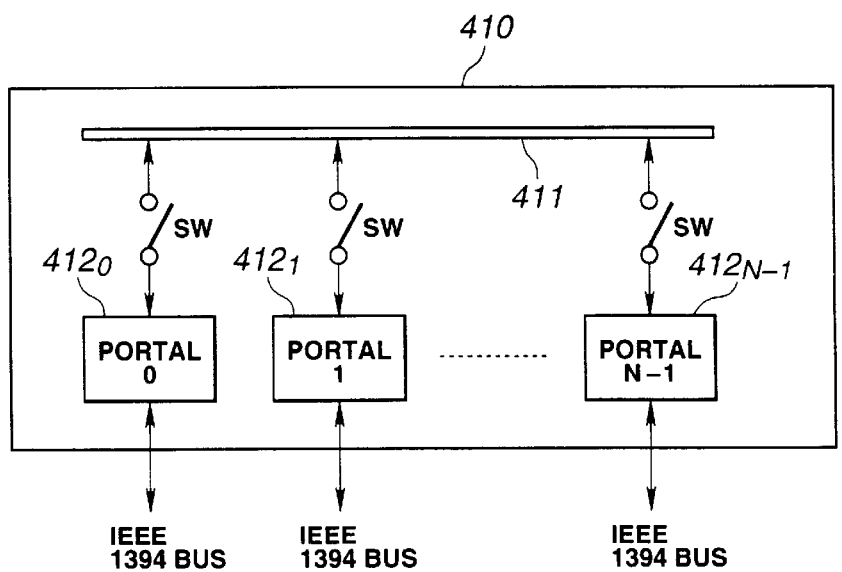
FIG. 5 is a schematic block diagram of a second bridge to provide a connection between subnets in the network system.

The second bridge is generally indicated with a reference 410. As shown in FIG. 5, the second bridge 410 comprises portals $412_0$, $412_1$ and $412_{N-1}$ connected to each other with a fabric 411 being a fiber channel switch. Each of the portals $412_0$, $412_1$ and $412_{N-1}$ is connected to each node with an IEEE 1394 bus, respectively. The second bridge will be further described later concerning its construction and function.

Figure 6:
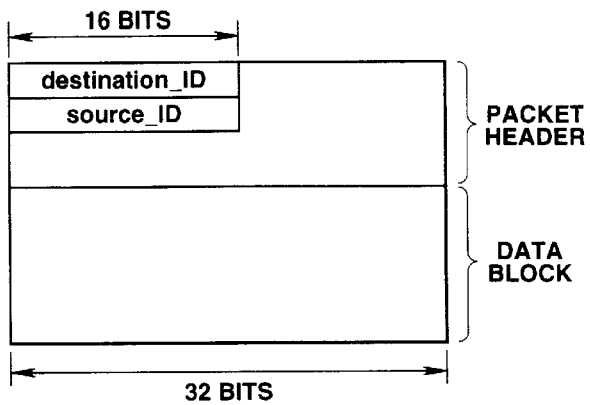
FIG. 6 shows a logical format of a packet used for data transfer from a node to any other in the network system.

Here the logical format of a packet used for transfer of a data from a node to any other in the network system will be described below with reference to FIG. 6. The packet comprises a packet header and a data block. The packet header includes a source ID field indicative of a source node ID, and a destination ID field. Each of the source and destination IDs is of 16 bits.

Figure 7A:
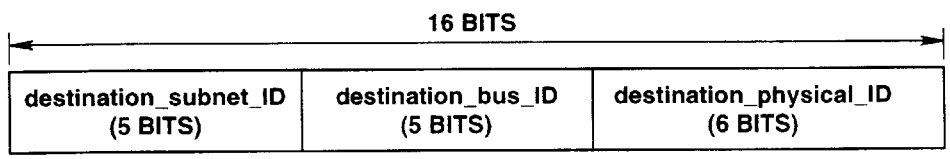
FIG. 7(A) shows a destination ID format.
Figure 7B:
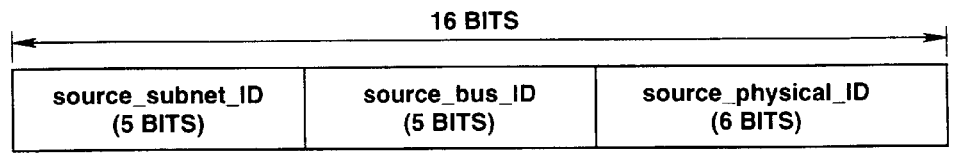
FIG. 7(B) shows a source ID format, in the packet.

As shown in FIG. 7(A), the 16-bit destination ID includes three fields of 5-bit subnetwork ID, 5-bit bus ID and 6-bit physical ID, respectively. Also the 16-bit source ID includes three fields for 5-bit subnetwork ID, 5-bit bus ID and 6-bit field ID, respectively, as shown in FIG. 7(B).

Figure 8A:
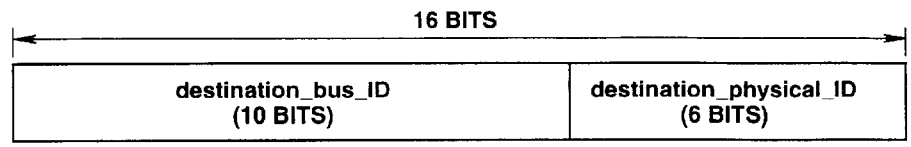
FIG. 8(A) shows a destination ID format.
Figure 8B:
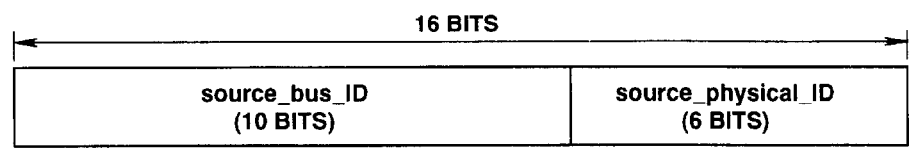
FIG. 8(B) shows a source format, in a packet used in the conventional network system.

FIGS. 8(A) and 8(B) show formats of the conventional destination ID and source IDs, respectively, for comparison with those of the destination and source IDs in the network system of the present invention. As seen, each of the conventional destination and source IDs includes only a 10-bit bud ID and 6-bit physical ID.

A packet is to be transferred mainly in three modes as will be shown below. A first mode of them is a "bus broadcast to transmit a packet to all nodes in one bus", the second one is a "global broadcast to transmit a packet to all nodes in a network system, and the third is a "unicast to transmit a packet to a single node". These destinations are identified with IDs of a packet as shown in Table 1.

TABLE 1

| Destination ID | | | Source ID | | | |
|---|---|---|---|---|---|---|
| Subnet | Bus | Physical | Subnet | Bus | Physical | |
| 0–1e | 0–1e | 0–3e | x | x | x | Unicast to certain node in certain bus |
| 0–1e | 0–1e | 3f | x | x | x | Broadcast to certain bus |
| 1f | 1f | 0–3e | x | x | x | Unicast to certain node in local bus |
| 1f | 1f | 3f | 0–1e | 0–1e | x | Broadcast to all buses |
| 1f | 1f | 3f | 1f | 1f | x | Broadcast to local bus |

In Table 1, the packet destination is defined in further detail. For example, when the subnetwork, bus and physical IDs in the destination ID field are 0–1e, 0–1e and 0–3e, respectively, in hexadecimal notation while all the subnetwork, bus and physical IDs in the source ID field are undefined (x: don't care), a packet is unicast to a certain node in a certain bus. When the subnetwork, bus and physical IDs in the destination ID field are 0–1e, 0–1e and 3f, respectively, while all the subnetwork, bus and physical IDs in the source ID field are undefined (x), a packet is broadcast to a certain bus. When the subnetwork, bus and physical IDs in the destination ID field are 1f, 1f and 0–3e, respectively, in hexadecimal notation while the subnetwork, bus and physical IDs in the source ID field are undefined (x), a packet is unicast to a certain node in a local bus. When the subnetwork, bus and physical IDs in the destination ID field are 1f, 1f and 3f, respectively, while the subnetwork, bus and physical IDs in the source ID field are 0–1e, 0–1e and undefined (x), respectively, a packet is globally broadcast to all buses. Also, when the subnetwork, bus and physical IDs in the destination ID field are 1f, 1f and 3f, respectively, in hexadecimal notation while the subnetwork, bus and physical IDs in the source ID field are 1f, 1f and undefined (x), respectively, a packet is broadcast to a local bus.

Figure 9A:
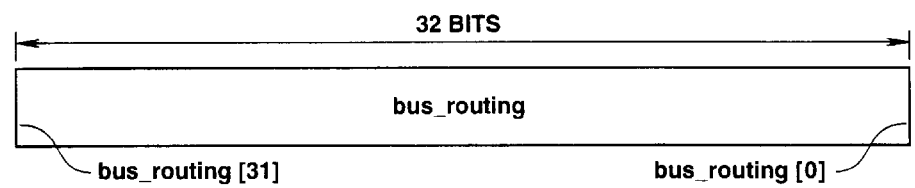
FIG. 9(A) shows a format of a bus routing register.
Figure 9B:
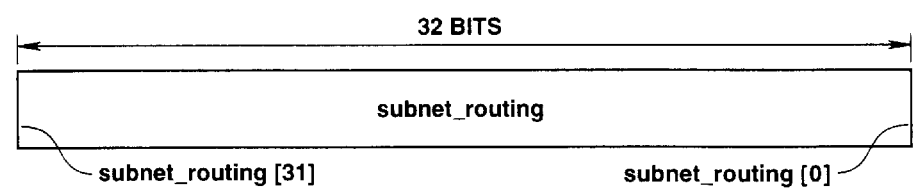
FIG. 9(B) shows a format of a channel routing register.
Figure 9C:
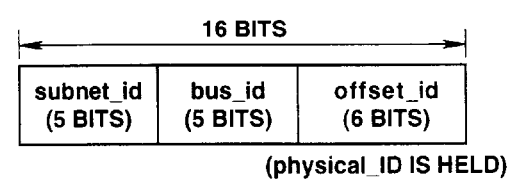
FIG. 9(C) shows a node IDs register, provided in the first bridge.

A packet transmitted from a node is delivered to all nodes in a bus. However, it is judged by the first bridge whether the packet is to be delivered to any other bus. To this end, the first bridge has three registers having formats as shown in FIG. 9. FIG. 9(A) shows a 32-bit bus routing register, FIG. 9(B) shows a 16-bit subnetwork routing register, and FIG. 9(C) shows a 5-bit node IDs register. The IDs register includes a 5-bit subnetwork ID field, 5-bit bus ID field, and a 6-bit offset ID field holding a physical ID, as shown in FIG. 9(C).

Figure 10A:
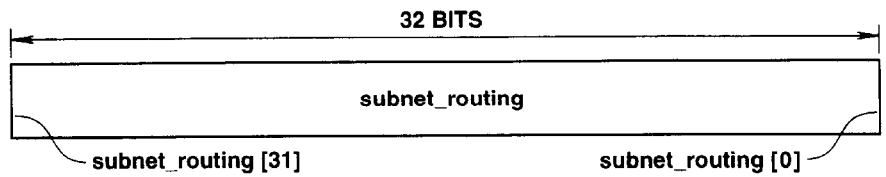
FIG. 10(A) shows a channel routing register.
Figure 10B:
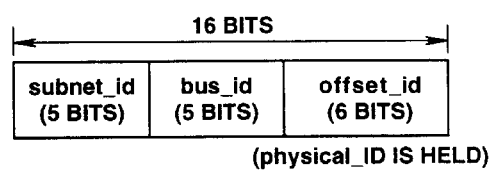
FIG. 10(B) shows a node IDs register, provided in the second bridge having two portals.

For judging whether the packet is to be transferred, the second bridge including two portals includes two registers: a 32-bit subnetwork routing register as shown in FIG. 10(A) and a 16-bit node IDs register as shown in FIG. 10(B). This node IDs register also includes a 5-bit subnetwork ID field, 5-bit bus ID field, and a 6-bit offset ID field holding a physical ID.

Figure 11A:
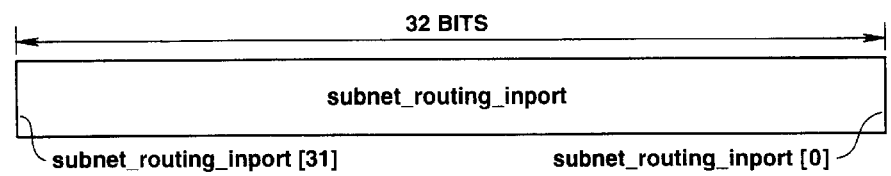
FIG. 11(A) shows a channel routing inport register.
Figure 11B:
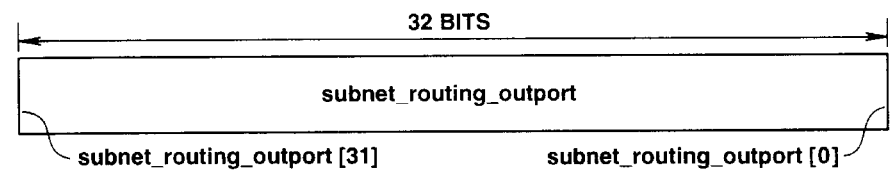
FIG. 11(B) shows a channel routing outport register.
Figure 11C:
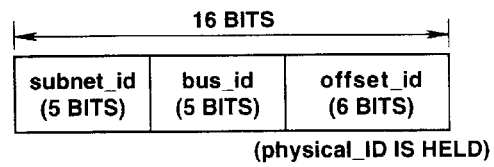
FIG. 11(C) shows a channel IDs register, provided in the second bridge having three portals.

For judging whether the packet is to be transferred, the second bridge including three portals has three registers: a 32-bit subnetwork inport routing register as shown in FIG. 11(A), a 32-bit subnetwork output routing register as shown in FIG. 11(B) and a 16-bit node IDs register as shown in FIG. 11(C). Also, this node IDs register includes a 5-bit subnetwork ID field, 5-bit bus ID field, and a 6-bit offset ID field holding a physical ID.

Figure 12:
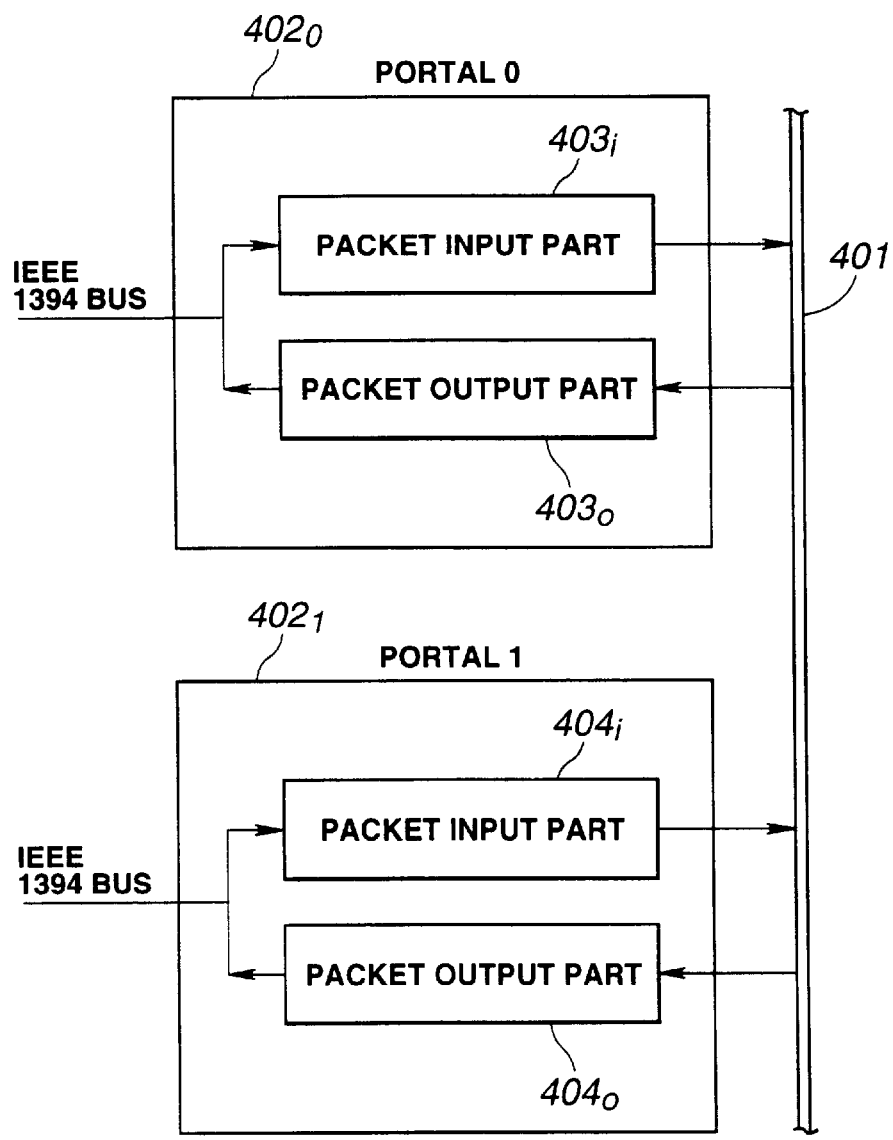
FIG. 12 shows, in a block form, the detail construction of the portal in the first bridge.

Next, the portals of the first bridge will be illustrated in detail in FIG. 12. The portals are generally indicated with references $402_0$ and $402_1$, respectively. The portal $402_0$ includes a packet input part $403_i$ and a packet output part $403_o$, and the portal $402_1$ includes a packet input part $404_i$ and a packet output part $404_o$. The packet input and output parts connected to an inner fabric 401 as shown.

Figure 13:
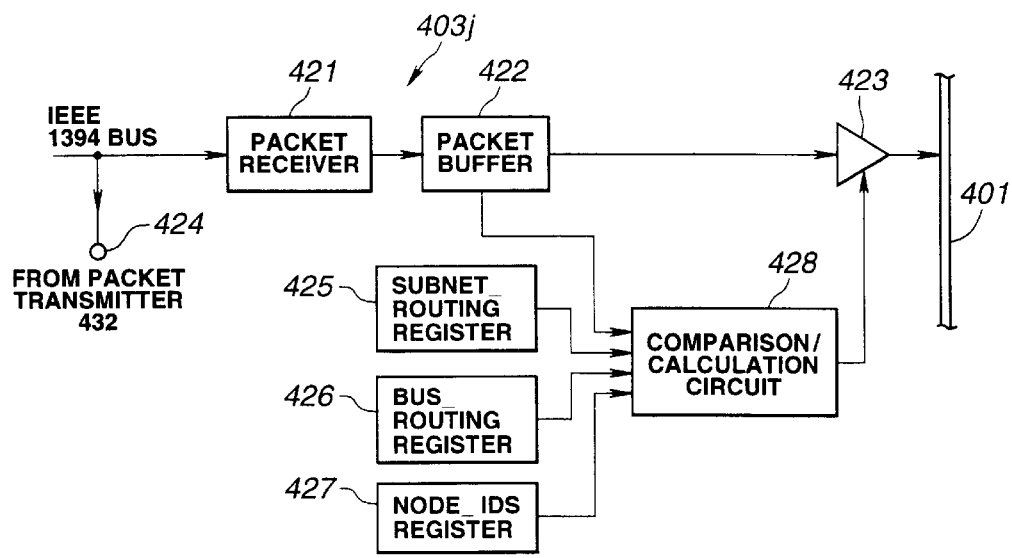
FIG. 13 shows, in a block form, the construction of a packet input part of the portal.

The packet input part $403_i$, for example, is constructed as shown in FIG. 13. A packet passed to an IEEE 1394 bus is received by a packet receiver 421, and stored into a packet buffer 422. Source and destination IDs from the packet buffer 422 are supplied to a comparison/calculation circuit 428 which is also supplied with ID values from the subnetwork routing register 425, bus routing register 426 and node IDs register 427 having been described with reference to FIG. 9. The comparison/calculation circuit 428 will judge, based on these signals, whether the packet is to be transferred, and when it decides that the packet is to be transferred, will activate an output signal, and open a gate 423 to transmit the packet to the inner fabric 401.

Figure 14:
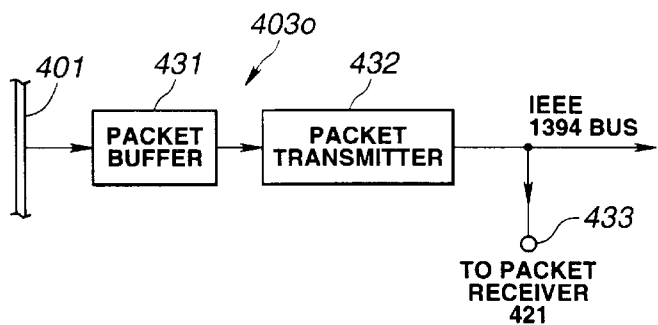
FIG. 14 shows, in a block form, the construction of a packet output part in the portal in FIG. 12.

On the other hand, the packet output part $403_o$, for example, is constructed as shown in FIG. 14. The packet having been passed to the inner fabric 401 is acquired into a packet buffer 431, and transmitted from a packet transmitter 432 to the packet receiver 421 the IEEE 1394 and an output terminal 433.

Figure 15:
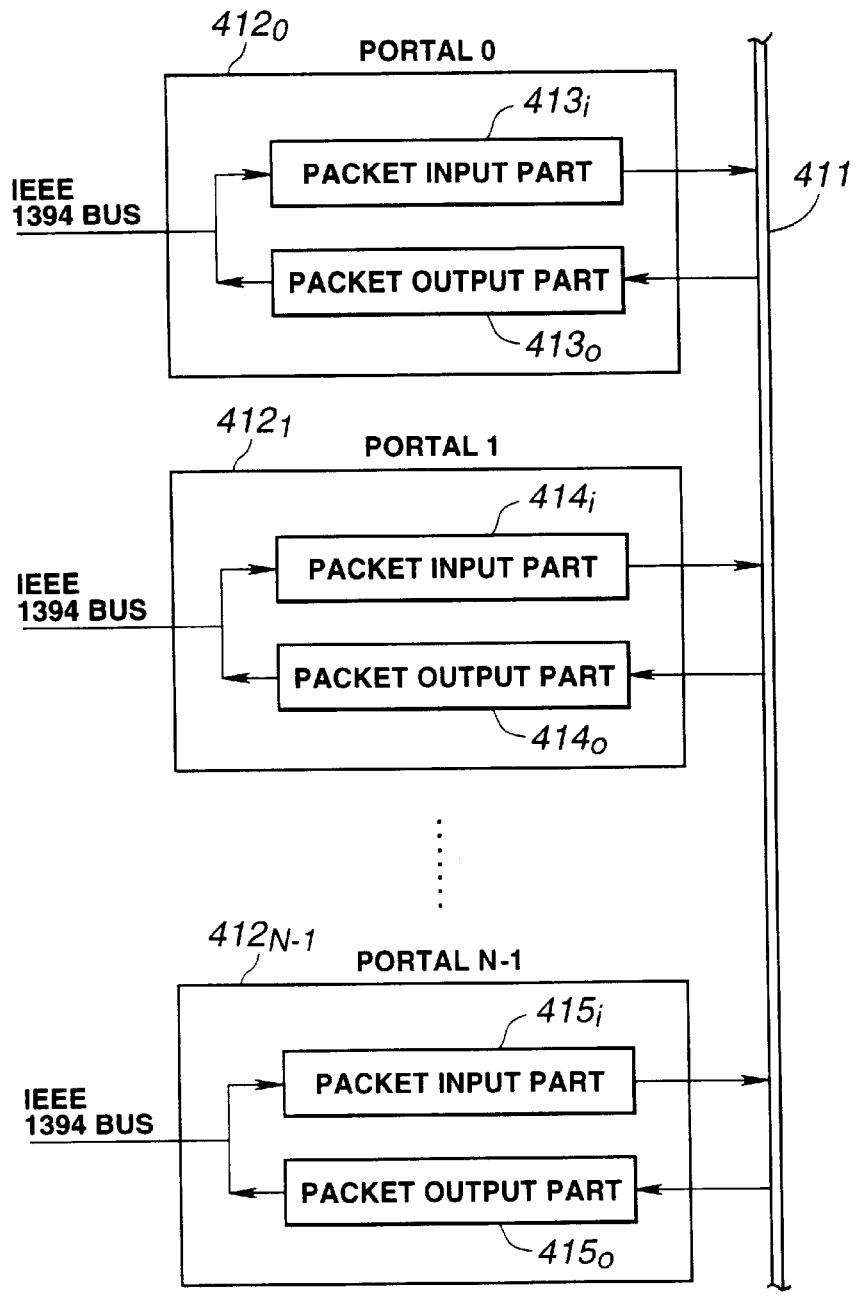
FIG. 15 shows, in a block form, the detail construction of the portal in the second bridge.

Next, the portals of the second bridge will be illustrated in detail in FIG. 15. The portals are generally indicated with references $412_0$, and $412_1$, and $412_{N-1}$, respectively. The portal $412_0$ includes a packet input part $413_i$ and a packet output part $413_o$, the portal $412_1$ includes a packet input part $414_i$ and a packet output part $414_o$ and the portal $412_{N-1}$ includes a packet input part $415_i$ and a packet output part $415_o$. The packet input and output parts are connected to an inner fabric 411 as shown.

First, the second bridge including two portals will be discussed concerning the packet input part $413_i$, for example, with reference to FIG. 16. A packet passed to an IEEE 1394 bus is received by a packet receiver 441, and stored into a packet buffer 442. Source and destination IDs from the packet buffer 442 are supplied to a comparison/calculation circuit 447 which is also supplied with ID values from the subnetwork routing register 445 and node IDs register 446 having been described with reference to FIG. 10. The comparison/calculation circuit 447 will judge, based on these signals, whether the packet is to be transferred, and when it decides that the packet is to be transferred, will activate an output signal, and open a gate 443 to transmit the packet to the inner fabric 411.

Figure 17:
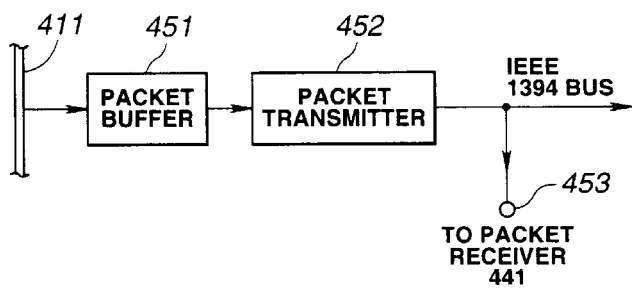
FIG. 17 shows, in a block form, the construction of a packet output part of the portal.

On the other hand, the packet output part 413$_o$, for example, is constructed as shown in FIG. 17. The packet having been passed to the inner fabric 411 is acquired into a packet buffer 451 and transmitted from a packet transmitter 452 to the packet receiver 441 the IEEE 1394 bus and an output terminal 453.

Figure 16:
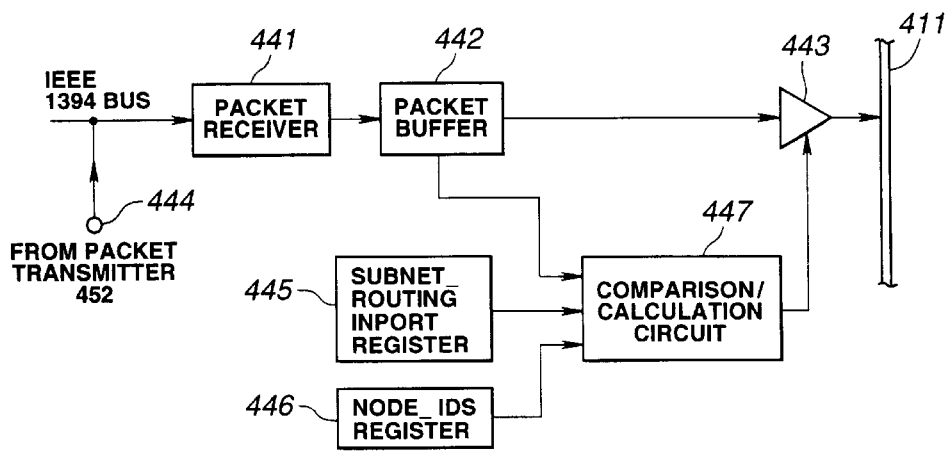
FIG. 16 shows, in a block form, the construction of a packet input part of the portal.

Also, the second bridge including three portals comprises, for the packet input part 413$i$, a subnetwork routing inport register 445 instead of the subnetwork routing inport register 445 shown in FIG. 16. The comparison/calculation circuit 447 will judge, based on these signals, whether the packet is to be transferred, and when it decides that the packet is to be transferred, will activate an output signal, and open a gate 443 to transmit the packet to the inner fabric 411.

Figure 18:
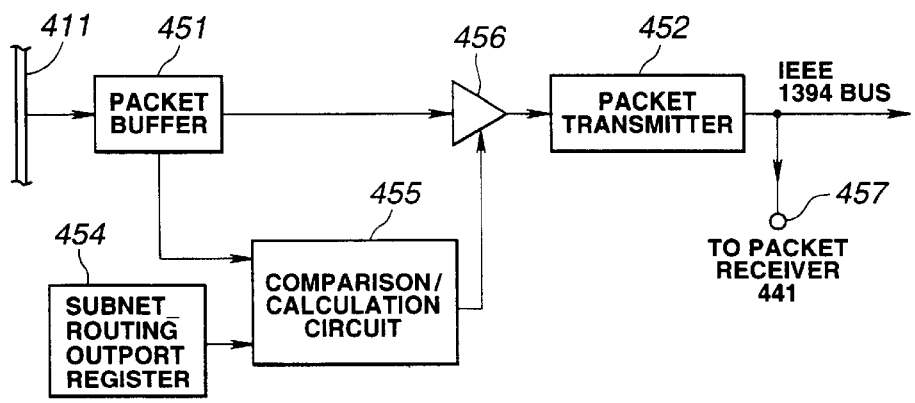
FIG. 18 shows, in block form, another construction of the packet output part of the portal.

On the other hand, the packet output part 413$_O$ acquires, into the packet buffer 451, a packet passed to the inner fabric 411 as shown in FIG. 18. The packet buffer 451 will supply source and destination IDs to the comparison/calculation circuit 455 which is also supplied with an output from the subnetwork routing outport register 454 having been described with reference to FIG. 11. The comparison/calculation circuit 455 will judge, based on these signals, whether the packet is to be transferred, and when it decides that the packet is to be transferred, will activate an output signal, and open a gate 456 to transmit the packet from the IEEE 1394 and an output terminal 453 to the inner fabric 411.

Figure 19:
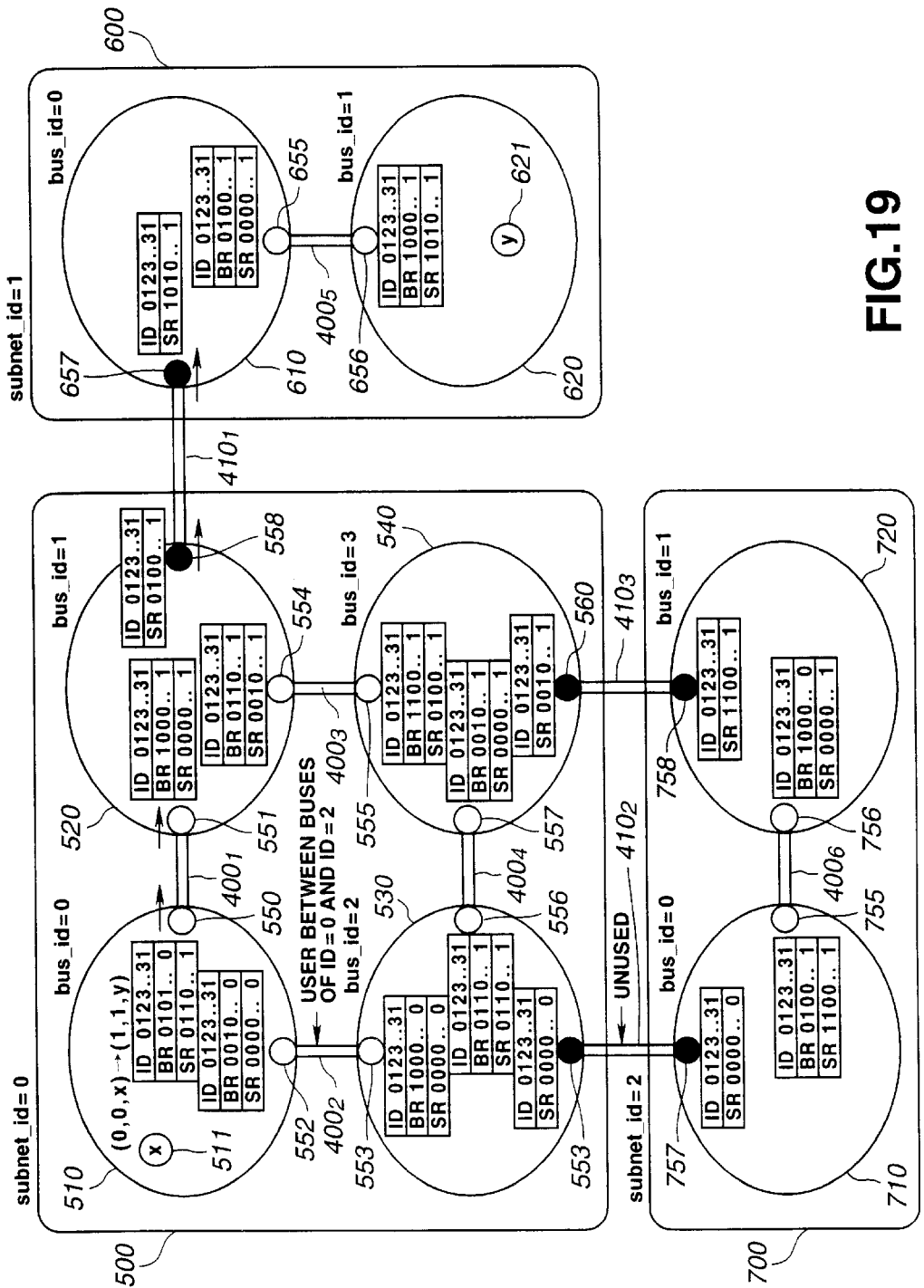
FIG. 19 shows, in detail, a network system comprising the second bridge using the two portals.
Figure 20:
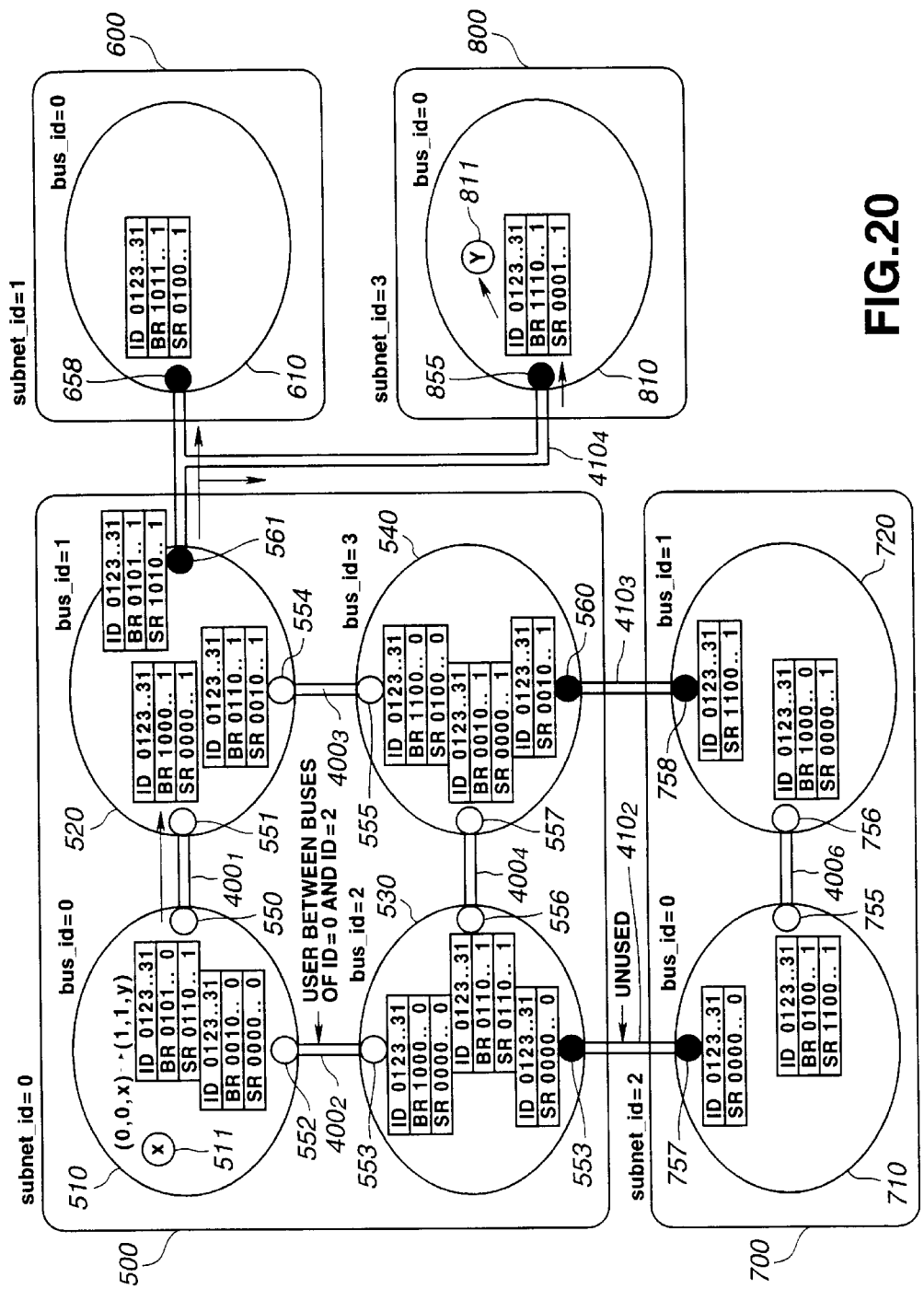
FIG. 20 shows, in detail, a network system comprising the second bridge using the three portals.

The network systems formed from various devices as having been described in the foregoing will be further described below with reference to FIGS. 19 to 23. FIG. 19 shows a network system comprising a second bridge including two portals. FIG. 20 shows another network system comprising a second bridge including three portals.

First, the network system shown in FIG. 19 comprises three subnetworks 500, 600 and 700 connected to each other and having subnetwork ID #0, #1 and #2, respectively.

The subnetwork 500 incorporates four buses 510, 520, 530 and 540 of ID #0, #1, #2 and #3, respectively. The buses 510 and 520 are connected to each other with a first bridge 400$_1$, buses 510 and 530 are connected to each other with a first bridge 400$_2$, buses 520 and 540 are connected to each other with a first bridge 400$_3$, and buses 530 and 540 are connected to each other with a first bridge 400$_4$.

The subnetwork 600 incorporates two buses 610 and 620 of ID #0 and #1, respectively. The buses 610 and 620 are connected to each other with a first bridge 400$_5$. The subnetwork 700 incorporates two buses 710 and 720 of ID #0 and #1, respectively, connected to each other with a first bridge 400$_6$.

The subnetworks 500 and 600 are connected to each other with a second portal 410$_1$, and the subnetworks 500 and 700 are connected to each other with second portals 410$_2$ and 410$_3$.

The first bridge 400$_1$ in the subnetwork 500 comprises a portal 550 in the bus 510, portal 551 in the bus 520 and a fabric (not shown). Similarly, the first bridge 400$_2$ comprises a portal 552 in the bus 510, portal 553 in the bus 530, and a fabric. Also, the first bridge 400$_3$ comprises a portal 552 in the bus 520, portal 553 in the bus 530, and a fabric.

The first bridge 400$_5$ in the subnetwork 600 comprises a portal 655 in the bus 610, portal 656 in the bus 620 and a fabric. Similarly, the first bridge 400$_6$ in the subnetwork 700 comprises a portal 755 in the bus 710, portal 756 in the bus 720, and a fabric.

The second bridge 410$_1$ connecting the subnetworks 500 and 600 comprises a portal 558 in the bus 520 of the subnetwork 500, portal 657 in the bus 610 of the subnetwork 600, and a fabric. Also, the second bridge 410$_2$ connecting the subnetworks 500 and 700 comprises portals 559 in the bus 530 of the subnetwork 500, portal 757 in the bus 710 of the subnetwork 700, and a fabric. The second bridge 410$_3$ comprises a portal 560 in the bus 540 of the subnetwork 500, portal 758 in the bus 720 of the subnetwork 700, and a fabric.

This network system shown in FIG. 19 will be functionally described concerning a packet transmission from the node (X) 511 forming the bus 510 in the subnetwork 500 to a node 621 (Y) forming a bus 620 in the subnetwork 600, by way of example. This packet transmission is included in the unicast to a certain node in a certain bus in Table 1. At this time, the subnetwork, bus and physical IDs in the destination ID field of the logical format of the packet is 1, 1 and y, respectively.

The packet input part of the portal 550 in the first bridge 400, is similar to the packet input part 403$_1$ shown in FIG. 13. A packet having of a subnetwork ID #1, bus ID #1 and physical ID #y in its destination ID field is received by the packet receiver 421 and stored in the packet buffer 422. A packet delivered from the packet buffer 422 and having a subnetwork ID #1 and bus ID #1 in its destination ID field is supplied to the comparison/calculation circuit 428 which is also supplied with ID values from the subnetwork routing register 425 and bus routing register 426 of the packet input part 403$_i$ of the portal 550 carry flags as shown in FIG. 19. Namely, when each of these registers has 32 flag storage locations having address ID #0, #1, #2, #3, . . . #31, name "0123 . . . 31", a flag "1" is set as each of the address IDs so as to correspond to bus and subnetwork IDs in the destination ID field of a destination to which a packet transfer is allowed. In the bus routing register 426, a flag is set in a location "0101 . . . 1" as indicated with BR. In the subnetwork routing register 425, a flag is set in a location "0110 . . . 1" as indicated with SR. Thus, receiving an ID value corresponding to the flag location, the comparison/calculation circuit 428 will be able to judge whether the packet is to be transferred. When the comparison/calculation circuit 428 decides that the packet is to be transferred, it will open the gate 423 to transmit the packet stored in the packet buffer 422 to the inner fabric 401.

Note that in the portal 552 in the first bridge 400$_1$ connecting the buses 510 and 530, the register BR in the packet input part thereof has a content "0010 . . . 0" while the register SR has a content "0000 . . . 0". In this case, the comparison/calculation circuit 428 will decide that the packet is not to be transferred and not open the gate 423. The second bridge 400$_2$ will not pass the packet.

On the other hand, the portal 551 forming along with the portal 550 the first bridge 400$_1$ will allow the packet transmitted from the portal 550 via the inner fabric into the packet output part similar in construction to the packet output part 403$_o$ shown in FIG. 14. The packet will be acquired into the packet buffer 431 and transmitted from the packet transmitter 432 to the packet receivers of the packet input parts in other portion and the portals 554 and 558 in the bus 520 via the IEEE 1394 bus.

In the portal 554, the register BR in the packet input part thereof has a content "0110 . . . 1" while the register SR has a content "0010 . . . 1". Thus, the comparison/calculation circuit will decide that the packet is not to be transferred and will not open the gate. The second bridge 400$_3$ will not pass the packet.

The packet input part of the portal 558 in the second bridge 410₁ is similar in construction to the packet input part 413ᵢ shown in FIG. 16. A packet having a subnetwork ID #1, bus ID #1 and physical ID #y in the destination ID field thereof is received by the packet receiver 441 and stored into the packet buffer 442. A subnetwork ID from the packet buffer 442, being "1", is supplied to the comparison/calculation circuit 447 which is also supplied with an ID value from the subnetwork routing inport register 445. The register 445 of the packet input part 413ᵢ in the portal 558 carries flags as shown in FIG. 19. Namely, the register SR has a content "0100 . . . 1". Therefore, the comparison/calculation circuit 447 will decide that the packet is to be transferred, and opens the gate 443 to transmit the packet stored in the packet buffer 442 to the inner fabric 411.

On the other hand, the portal 657 forming along with the portal 558 the second bridge 410₁ passes the packet received via the inner fabric 411 to a packet output part similar in construction to the packet output part 413ₒ shown in FIG. 17. Then the packet is acquired into the packet buffer 451 and transmitted from the packet transmitter 452 to the portal 655 via the IEEE 1394 bus.

The portal 655 forms the first bridge 400₅ connecting the buses 610 and 620, and comprises a packet input part similar in construction to the packet shown in FIG. 13. It includes a register BR having a content "0100 . . . 1" and a register SR having a content "0000 . . . 1". Therefore, the comparison/calculation circuit will decide that the packet is to be transferred, and open the gate 423 to transmit the packet to the inner fabric 401.

The portal 656 forming along with the portal 655 the first bridge 400₅ will allow the packet transmitted from the portal 655 via the inner fabric into the packet output part similar in construction to the packet output part 403ₒ shown in FIG. 14. The packet will be acquired into the packet buffer and transmitted from the packet transmitter via the IEEE 1394 bus to a node 621 having a physical ID #y.

The network system shown in FIG. 20 is formed from four subnetworks 500, 600, 700 and 800 having IDs 0, 1, 2 and 4, respectively, connected to each other.

The subnetwork 500 is constructed generally similarly to the subnetwork 500 shown in FIG. 19 except for a portal 561 forming along with two other portals 658 and 855 a second bridge 410₄ in the bus 520.

The subnetwork 600 incorporates a bus 610 having an ID #0. The bus 610 includes the portal 658. The subnetwork 800 incorporates a bus 810 having an ID #0 and including the portal 855. The subnetwork 700 is constructed similarly to the subnetwork 700 in FIG. 19.

This network system shown in FIG. 20 will be functionally described concerning a packet transmission from the node (X) 511 forming the bus 510 in the subnetwork 500 to a node 811 (Y) forming a bus 820 in the subnetwork 800, by way of example. This packet transmission is included in the unicast to a certain node in a certain bus in Table 1. At this time, the subnetwork, bus and physical IDs in the destination ID field of the logical format of the packet is 3, 0 and y, respectively.

The network system in FIG. 19 has a large difference from that in FIG. 20 in that the second bridge 410₄ connecting the three subnetworks 500, 600 and 800 is formed from three portals 561, 658 and 855.

First, the portal 550 in the first bridge 400₁ has a packet input part similar in construction to the packet input part 403ᵢ shown in FIG. 13. A packet having a subnetwork ID #3, bus ID #0 and physical ID #y in the destination ID field thereof is received by the packet receiver 421 and stored into the packet buffer 422. A packet from the packet buffer 422 having a subnetwork ID #3 and bus ID #0 in the destination ID field thereof is supplied to the comparison/calculation circuit 428 which is also supplied with ID values from the subnetwork routing register 425 and bus routing register 426. The two registers 425 and 426 of the packet input part 403ᵢ in the portal 550 carry flags as shown in FIG. 19. Namely, the register BR has a flag contains "0101 . . . 1" while the register SR has a flag content "0111 . . . 1". Therefore, the comparison/calculation circuit 428 decides that the packet is to be transferred, and opens the gate 423 to transmit the packet stored in the packet buffer 422 to the inner fabric 401. Since the operations of the portals 551, 552 and 554 are the same as mentioned above, they will not be described any longer.

The portal 561 in the bus 520 has a packet input part similar in construction to that shown in FIG. 16 except that the subnet routing register 445 is a subnet routing inport register 445. The register SRI has a flag content "0101 . . . 1" as shown in FIG. 20. Therefore, the comparison/calculation circuit 447 will open the gate 443 to transmit the packet to the inner fabric 411.

Note that the packet output parts of the portals 658 and 855, respectively, are similar in construction to the packet output part shown in FIG. 18, and acquire the packet from the inner fabric 411 into the packet buffer 451. A packet from this packet buffer 451 having a subnetwork ID in the destination ID field thereof is supplied to the comparison/calculation circuit 455 which is also supplied with a signal from the subnetwork routing outport register 454. In the network system in FIG. 20, the register SR in the portal 658 has a flag content "0100 . . . 1" and the register SR in the portal 855 has a flag content "0001 . . . 1".

Thus, deciding that the packet is not to be transmitted, the comparison/calculation circuit 455 of the packet output part in the portal 658 will not open the gate 456. On the other hand, the comparison/calculation circuit of the packet output part in the portal 855 decides that the packet is to be transmitted and opens the gate to transmit a packet from the packet transmitter 452 to a node (Y) 811 of a physical ID #Y via the IEEE 1394.

Figure 21:
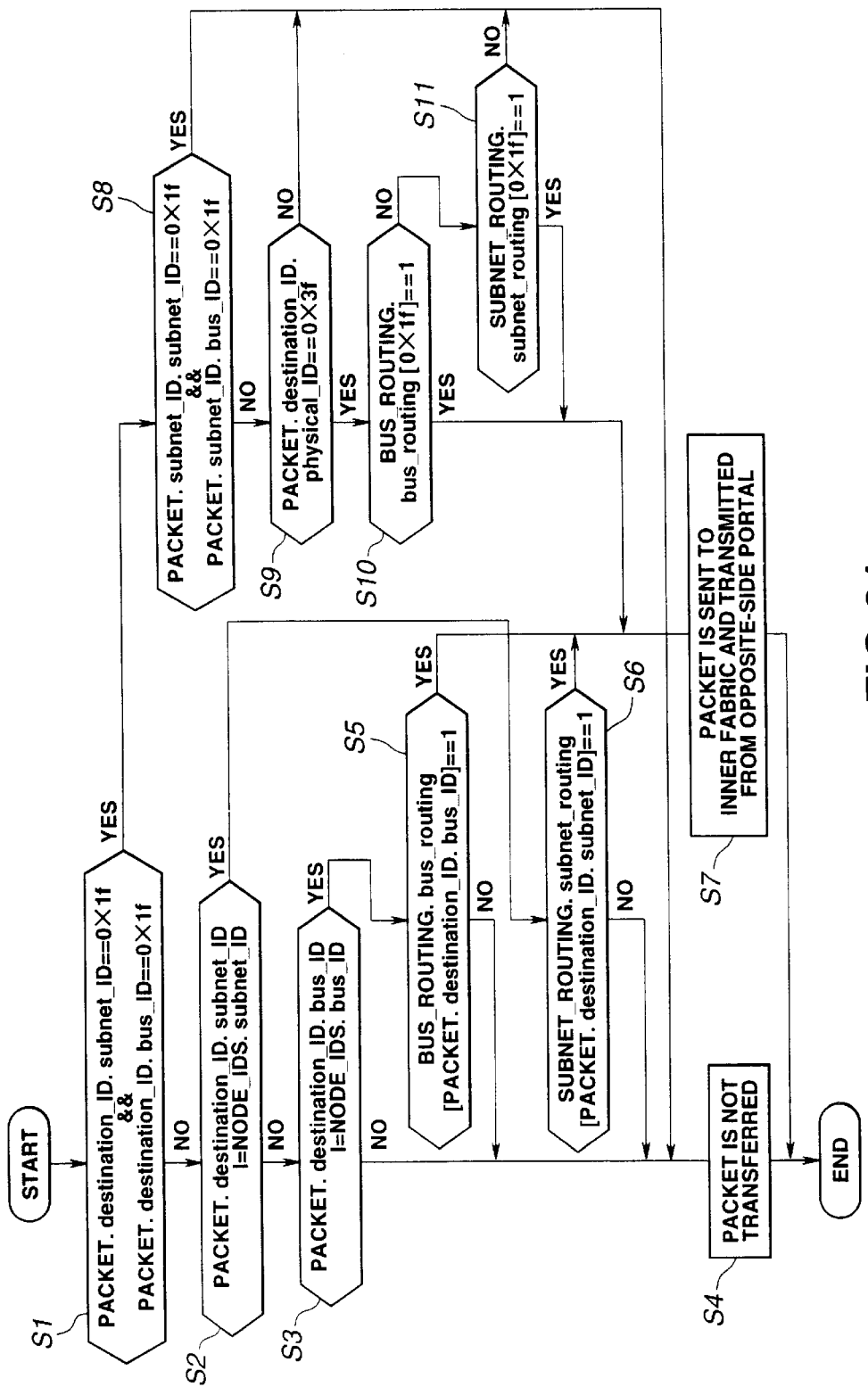
FIG. 21 is a flow chart of an algorithm of a decision effected in the portal of the first bridge at reception of the packet.

The judgment algorithm used at the portal in the first bridge at the time of packet reception will be described with reference to FIG. 21.

First, it is judged at step S1 whether the subnetwork and bus IDs in the destination ID field of a received packet is "0×1f". When it is decided that the IDs are not "0×1f", the operation goes to step S2. At this step S2, it is judged whether the subnetwork ID in the destination ID field and that in the node IDs field of the packet are equal to each other. If it is decided that they are not equal to each other, the operation goes to step S3. It is judged at this step S3 whether the bus ID in the destination ID field and that in the node IDs field of the packet are equal to each other. When it is decided that they are equal to each other, the operation goes to step S4 and the packet is not transferred.

On the other hand, if it is decided at step S3 that the bus ID in the destination ID field and that in the node IDs field are not equal to each other, the operation goes to step S5. At this step S5, the content of the bus routing register is read and it is judged whether the content is equal to the bus ID. When it is decided that they are equal to each other, the operation goes to step S7 to deliver the packet to the inner fabric from which the packet is transmitted from the portal on the opposite side. If it is decided that they are not equal, the operation goes to step S4 and the packet is not transmitted.

If it is decided at Step S2 that the subnetwork ID in the destination ID field is not equal to that in the node IDs field, the operation goes to step S6 where the subnet routing register content is read to judge whether the ID value is equal to the subnetwork ID. When it is decided that they are equal to each other, the operation goes to step S7 where the packet is delivered to the inner fabric from which the packet is transmitted from the portal on the opposite side. If they are not equal, the operation goes to step S4 and the packet is not transferred.

If it is decided at step S1 that the subnetwork and bus IDs in the destination ID field are "0×1f", the operation goes to step S8 where it is judged whether the subnetwork and bus IDs in the destination ID field are "0×1f". When it is decided that they are not "0×1f", the operation goes to step S9 where it is judged whether the physical ID in the destination ID field is "0×3f". When it is decided that the physical ID is "0×3f", the operation goes to step S10 where the bus routing register content "0×1f" is 1. If it is decided that the register content is 1, the operation goes to step S7. The packet is delivered to the inner fabric from which it is transmitted from the portal on the opposite side.

When it is decided at step S8 that the subnetwork and bus IDs are "0×1f" or when it is decided at step S9 that the physical ID is not "0×3f", the operation goes to step S4 and the packet is not transferred.

When it is judged at step S10 that the bus routing register content "0×1f" is not 1, the operation goes to step S11 where it is judged whether the subnetwork routing register content "0×1f" is 1. If the register content is 1, the operation goes to step S7 and the packet is delivered to the inner fabric from which the packet is transmitted from the portal on the opposite side. When it is decided that the register content is not 1, the operation goes to step S4 and the packet is not transferred.

Figure 22:
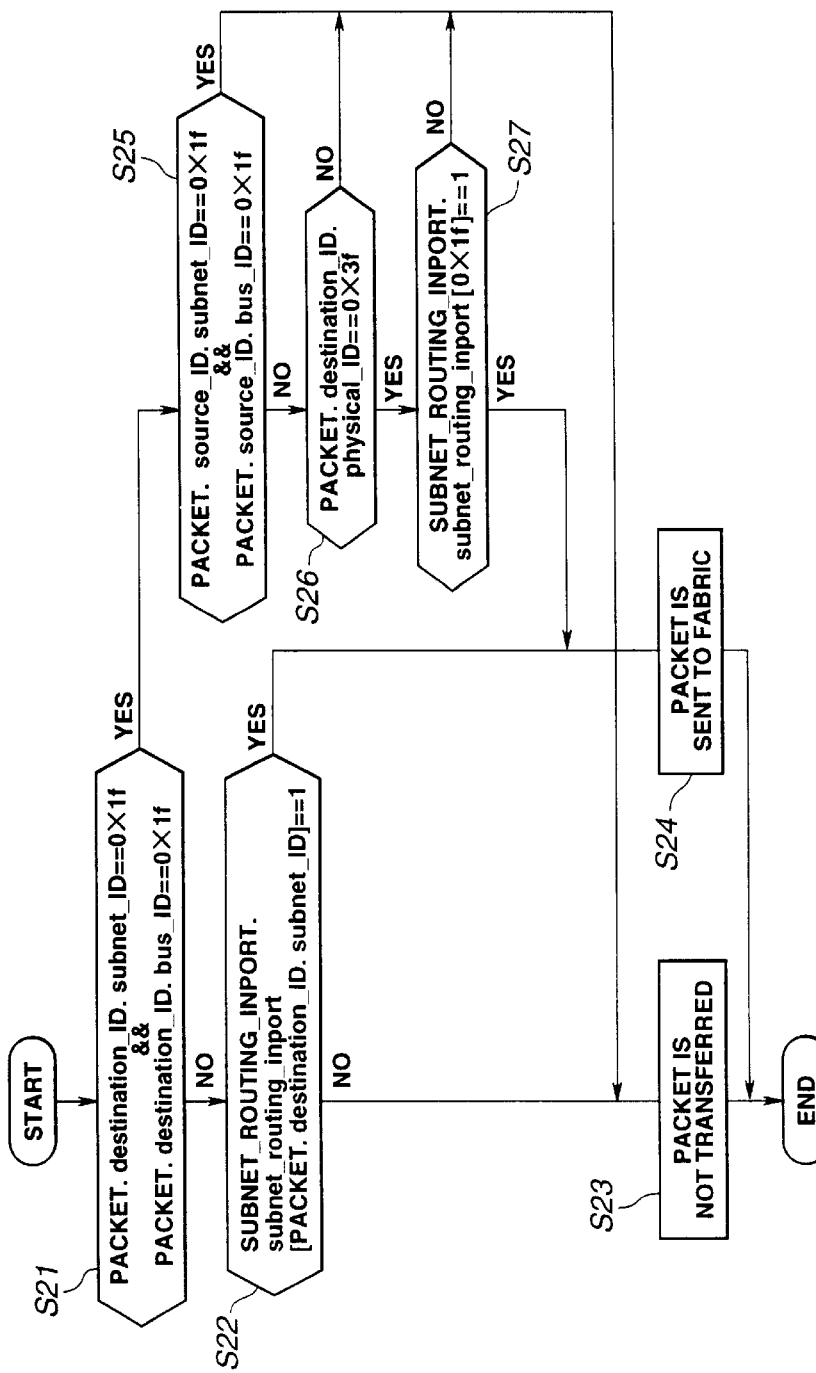
FIG. 22 is a flow chart of an algorithm of a decision effected in the input part of the portal of the second bridge at reception of the packet.

Next, the judgment algorithm used at the input side of each of three portals of the second bridge at the time of packet reception will be described with reference to FIG. 22.

First, it is judged at step S21 whether the subnetwork and bus IDs in the destination ID field of a received packet is "0×1f". When it is decided that the IDs are not "0×1f", the operation goes to step S22. At this step S22, it is judged whether the subnetwork routing inport register content and the subnetwork ID in the destination ID field of the packet are equal to each other. If it is decided that they are not equal to each other, the operation goes to step S23 and the packet is not transferred. When it is decided that they are equal to each other, the operation goes to step S24 and the packet is delivered to the inner fabric.

On the other hand, if it is decided at step S21 that the subnetwork and bus IDs are "0×1f", the operation goes to step S25. At this step S25, it is judged whether the subnetwork and bus IDs in the destination ID field are "0×1f". If it is decided that they are not "0×1f", the operation goes to step S26 where it is judged whether the physical ID in the destination ID field of the packet is "0×3f". If it is decided that the physical ID is "0×3f", the operation goes to step S27 where it is judged whether the subnetwork routing inport register content "0×1f" is 1. When it is judged that it is 1, the operation goes to step S24 and the packet is transferred to the inner fabric.

On the other hand, if it is decided at step S25 that the subnetwork and bus IDs are "0×1f", if it is decided at step S26 that the physical ID is not "0×3f" or if it is decided at step S27 that the subnetwork routing inport register content is not 1, the operation goes to step S23 and the packet is not transferred.

Figure 23:
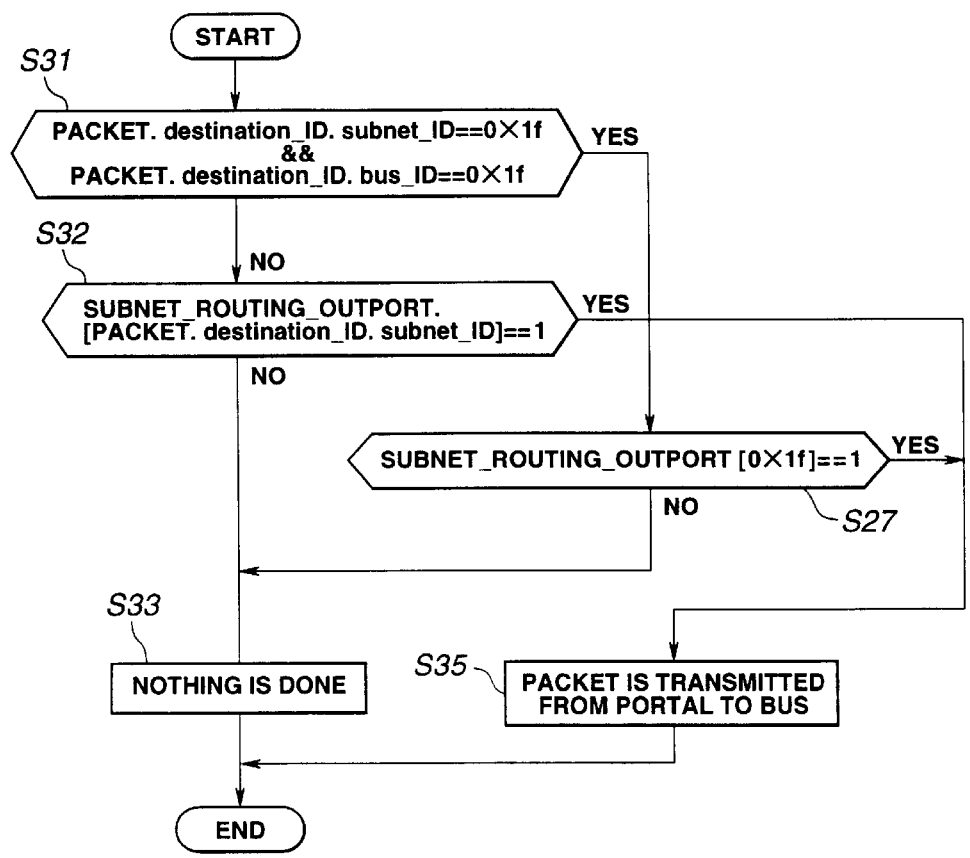
FIG. 23 is a flow chart of an algorithm of a decision effected in the output part of the portal of the second bridge at reception of the packet.

Finally, the judgment algorithm used at the output side of each of three portals of the second bridge at the time of packet reception will be described with reference to FIG. 23.

First at step S31, it is judged whether the subnetwork and bus IDs in the destination ID field of a received packet are "0×1f". If it is decided that they are not "0×1f", the operation goes to step S32 where it is judged whether the subnetwork routing outport register content and the subnetwork ID in the destination ID field of the packet are equal to each other. If it is decided that they are not equal, the operation goes to step S33 and nothing is done.

On the other hand, if it is decided at step S31 that the subnetwork and bus IDs are "0×1f", the operation goes to step S34 where it is judged whether the subnetwork routing outport register content "0×1f" is 1. When it is decided that the subnetwork routing outport register content "0×1f" is not 1, the operation goes to step S33 and nothing is done.

If it is decided at step S32 that the subnetwork routing output register content is equal to the subnetwork ID in the destination ID field of the packet, the operation goes to S35 and the packet is transmitted from the portal to the bus. Also when it is decided at step S34 that the register content "0×1f" is 1, the operation goes to step S35 and the packet is transmitted from the portal to the bus.

According to the present invention, a network formed from nodes conforming to IEEE 1394 is a hierarchy formed from buses and subnetworks such that it can be judged for each ID whether a packet is to be routed over a bridge. Therefore, bus and subnetwork IDs can be freely assigned as compared with the conventional network system in which packet routing is done through comparison in magnitude between IDs. Thus, less ID reassignment is required even when the bus topology has changed.

Even when the topology has changed in a different subnetwork, no ID reassignment is required and thus the network system is maintained stable.

What is claimed is:

1. A network system comprising:
   a plurality of subnetworks each formed from at least one bus in which at least one node is connected via a common transmission control signal channel;
   a first bridge holding first flags for the buses in the plurality of subnetworks and second flags representing a number of the plurality of subnetworks; and
   a second bridge connecting the plurality of subnetworks and holding the second flags for the number of subnetworks,
   wherein the second bridge includes comparing means for comparing a destination ID of the input packet data with the first and second flags, and acquisition means for acquiring the input packet data into the second bridge corresponding to a result of the comparison from the comparing means.

2. The network system as- set forth in claim 1, wherein the first bridge judges, based on the first and second flags, whether a packet data from the node is to be transferred to any other bus.

3. The network system as set forth in claim 2, wherein the first bridge comprises:
   comparing means for comparing a destination ID of the packet data and the first and second flags; and
   outputting means for outputting the packet data corresponding to a result of the comparison from the comparing means.

4. The network system as set forth in claim 1, wherein the second bridge judges, based on the first and second flags, whether a packet data from the node is to be transferred to any other subnetwork.

5. The network system as set forth in claim 4, wherein the second bridge comprises:

comparing means for comparing a destination ID of the packet data and the first and second flags; and outputting means for outputting the packet data corresponding to a result of the comparison from the comparing means.

6. The network system as set forth in claim 1, wherein the first bridge comprises two input/output means for connection to one bus and any other bus, respectively.

7. The network system as set forth in claim 1, wherein the second bridge comprises two input/output means for connection to one subnetwork and any other subnetwork, respectively.

8. The network system as set forth in claim 1, wherein the second bridge carries the second flags for the number of subnetworks to judge whether an input packet data is to be transferred to any other subnetwork and to judge whether the input packet data entered into the second bridge is to be output.

9. The network system as set forth in claim 1, wherein the comparing means is formed of first comparing means and the second bridge further comprises:

second comparing means for comparing the destination ID of the input packet data acquired into the second bridge by the acquisition means with the first and second flags; and transferring means for transferring the input packet data from the input/output means corresponding to a result of the comparison from the second comparing means.

10. The network system as set forth in claim 1, wherein the second bridge comprises at least four input/output means for connecting at least four of the plurality of subnetworks.

* * * * *